(12) United States Patent
Connell et al.

(10) Patent No.: US 11,003,934 B2
(45) Date of Patent: May 11, 2021

(54) METHOD, APPARATUS, AND SYSTEM FOR SELECTING SENSOR SYSTEMS FOR MAP FEATURE ACCURACY AND RELIABILITY SPECIFICATIONS

(71) Applicant: HERE GLOBAL B.V., Eindhoven (NL)

(72) Inventors: Jeff Connell, Walnut Creek, CA (US); Anish Mittal, San Francisco, CA (US)

(73) Assignee: HERE Global B.V., Eindhoven (NL)

( * ) Notice: Subject to any disclaimer, the term of this patent is extended or adjusted under 35 U.S.C. 154(b) by 66 days.

(21) Appl. No.: 16/557,413

(22) Filed: Aug. 30, 2019

(65) Prior Publication Data

US 2021/0064902 A1 Mar. 4, 2021

(51) Int. Cl.
*G06K 9/00* (2006.01)
*G06K 9/03* (2006.01)
*G06K 9/62* (2006.01)

(52) U.S. Cl.
CPC .......... *G06K 9/03* (2013.01); *G06K 9/00785* (2013.01); *G06K 9/00798* (2013.01); *G06K 9/6212* (2013.01)

(58) Field of Classification Search
None
See application file for complete search history.

(56) References Cited

U.S. PATENT DOCUMENTS

| 9,555,740 B1 | 1/2017 | Zhu et al. |
| 10,269,192 B2 | 4/2019 | Garrett et al. |
| 2017/0122748 A1 | 5/2017 | Theodosis |
| 2019/0064799 A1 | 2/2019 | Amirloo Abolfathi |
| 2019/0078893 A1* | 3/2019 | Waldron ................. G01S 3/023 |

FOREIGN PATENT DOCUMENTS

EP 2793045 A1 10/2014

OTHER PUBLICATIONS

European Office Action for related European Patent Application No. 20193440.3-1001 dated Jan. 28, 2021, 9 Pages.
Wilson et al., "The Potential of Precision Maps in Intelligent Vehicles", Daimler-Benz Research and Technology Center, Published in in IEEE International Conference on Intelligent Vehicles, 1998, 4 pages.

* cited by examiner

*Primary Examiner* — Soo Jin Park
(74) *Attorney, Agent, or Firm* — Ditthavong, Steiner & Mlotkowski

(57) ABSTRACT

An approach is provided for automatically selecting the most appropriate sensor system for high-definition map feature accuracy and reliability specifications. The approach, for example, involves selecting at least one survey point that has a known physical location. The approach also involves initiating a plurality of passes to capture a plurality of images of the at least one survey point using a sensor system. For each pass, the approach further involves calculating an estimated location of the at least one survey point based on the plurality of images and calculating error data based on the estimated location and the known location. The approach also involves generating an error curve with respect to a number of the plurality of passes based on the error data for said each pass. The approach further involves providing an output indicating a target number of passes to meet an error specification based on the error curve.

20 Claims, 12 Drawing Sheets

METHOD, APPARATUS, AND SYSTEM FOR SELECTING SENSOR SYSTEMS FOR MAP FEATURE ACCURACY AND RELIABILITY SPECIFICATIONS

BACKGROUND

Modern location-based services and applications (e.g., autonomous driving) are increasingly demanding highly accurate and detailed high-resolution digital map data (e.g., centimeter-level accuracy or better) across wide geographic areas. To achieve such levels of coverage, map service providers have relied on data (e.g., imagery) collected from a variety of sources with different views or perspectives (e.g., top-down imagery from satellites, ground-level imagery from surface vehicles, etc.). Map service providers can then, for instance, identify common semantic features (e.g., lane markings, signs, etc.) across the image views for map making, localization, and/or other similar location-based services. With the advent of less expensive systems deployed in vehicles (e.g., global positioning system (GPS), camera, etc.) crowd-sourced mapping and change detection data is becoming increasingly feasible. However, the positional quality of the semantic features derived from such sensor data is heavily dependent on the sensor system used for the data collection and the reliability on the number of observations/passes made by the vehicle. Accordingly, map service providers face significant technical challenges to automatically select the most appropriate ground-level sensor system before the corresponding data is incorporated into high-resolution digital maps for modern automated applications (e.g., autonomous driving).

SOME EXAMPLE EMBODIMENTS

Therefore, there is a need for an approach for automatically selecting the most appropriate sensor system for high-definition map feature accuracy and reliability specifications.

According to one embodiment, a method comprises selecting at least one survey point that has a known physical location. The method also comprises initiating a plurality of passes to capture a plurality of images of the at least one survey point using a sensor system. For each pass of the plurality of passes, the method further comprises calculating an estimated location of the at least one survey point based on the plurality of images and calculating error data based on the estimated location and the known physical location. The method also comprises generating an error curve with respect to a number of the plurality of passes based on the error data for said each pass. The method further comprises providing an output indicating a target number of passes to meet an error specification based on the error curve.

According to another embodiment, an apparatus comprises at least one processor, and at least one memory including computer program code for one or more computer programs, the at least one memory and the computer program code configured to, with the at least one processor, cause, at least in part, the apparatus to select at least one survey point that has a known physical location. The apparatus is also caused to initiate a plurality of passes to capture a plurality of images of the at least one survey point using a sensor system. For each pass of the plurality of passes, the apparatus is further caused to calculate an estimated location of the at least one survey point based on the plurality of images and calculate error data based on the estimated location and the known physical location. The apparatus is also caused to generate an error curve with respect to a number of the plurality of passes based on error data for said each pass. The apparatus is further caused to provide an output indicating a target number of passes to meet an error specification based on the error curve.

According to another embodiment, a non-transitory computer-readable storage medium carrying one or more sequences of one or more instructions which, when executed by one or more processors, cause, at least in part, an apparatus to perform selecting at least one survey point that has a known physical location. The apparatus is also caused to initiate a plurality of passes to capture a plurality of images of the at least one survey point using an image-based sensor system. For each pass of the plurality of passes, the apparatus is further caused to calculate an estimated location of the at least one survey point based on the plurality of images and calculate error data based on the estimated location and the known physical location. The apparatus is also caused to generate an error curve with respect to a number of the plurality of passes based on the error data for said each pass. The apparatus is further caused to provide an output indicating a target number of passes to meet an error specification based on the error curve.

According to another embodiment, an apparatus comprises means for selecting at least one survey point that has a known physical location. The apparatus also comprises means for initiating a plurality of passes to capture a plurality of images of the at least one survey point using a sensor system. For each pass of the plurality of passes, the apparatus further comprises means for calculating an estimated location of the at least one survey point based on the plurality of images and calculating error data based on the estimated location and the known physical location. The apparatus also comprises means for generating an error curve with respect to a number of the plurality of passes based on the error data for said each pass. The apparatus further comprises means for providing an output indicating a target number of passes to meet an error specification based on the error curve.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for selecting a sensor system based on its ability to meet high-definition map feature accuracy and reliability specifications are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
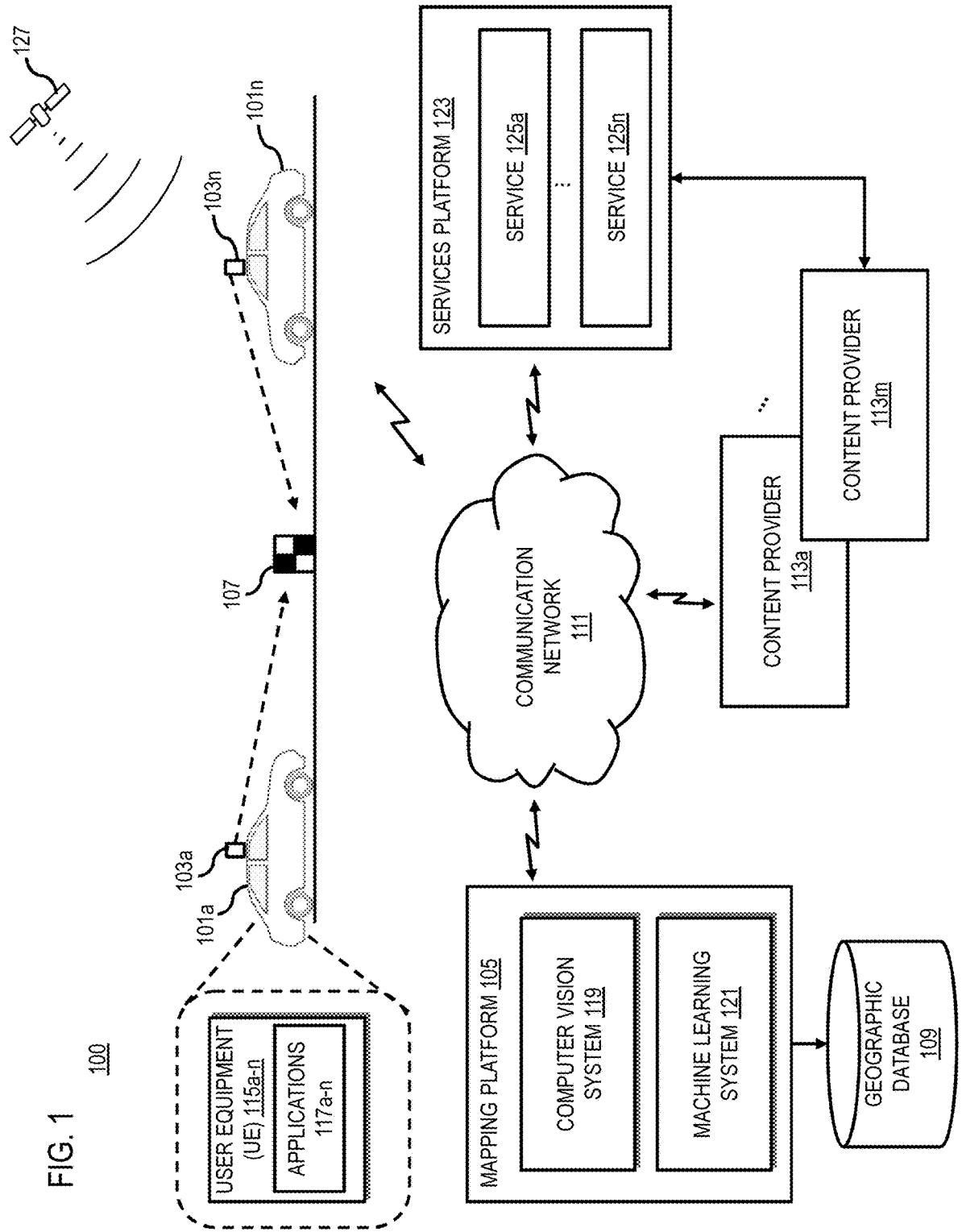
FIG. 1 is a diagram of a system capable of automatically selecting the most appropriate sensor system for high-definition map feature accuracy and reliability specifications, according to one embodiment.

FIG. 1 is a diagram of a system capable of automatically selecting the most appropriate sensor system for high-definition map feature accuracy and reliability specifications, according to one embodiment. As indicated above, automated driving is quickly becoming a reality following advances in machine learning, computer vision, and compute power. The ability to perceive the world with an accurate semantic understanding can enable one or more vehicles 101a-101n (also collectively referred to as vehicles 101) (e.g., autonomous, high assisted driving (HAD), or semi-autonomous vehicles) to obey driving rules and avoid collisions without direct human intervention. As these perceptual abilities have improved, so too has the need for highly accurate and up-to-date digital maps. Path planning, for instance, requires knowledge of what to expect beyond a vehicle 101's perceptual horizon, and driving in complicated urban environments with many occluding objects requires a knowledge of what cannot be detected by one or more vehicle sensors 103a-103n (also collectively referred to as vehicle sensors 103)(e.g., a camera sensor, Light Detection and Ranging (LiDAR), etc.).

In response, map service providers (e.g., operating a mapping platform 105) are creating extremely accurate and up-to-date high-resolution maps. High-definition digital maps in the form of models of the environment are needed for a wide range of automated applications including transportation, guidance (e.g., farming and/or harvesting), and search and rescue. Learning and automating the map creation and update process has therefore been a major research focus in the robotics and artificial intelligence (AI) community for years.

Different sources of raw data (e.g., image data) can be exploited to make such high-definition digital maps. For example, top-down sources, like satellite, aerial, and drone images, can be used to precisely determine the location of roads and other features on the Earth (e.g., map features such as lane lines, road boundaries, etc.). These images help create maps at a much larger scale but are more limited to surface features.

Ground sources like vehicles 101 and/or robots fitted with vehicle sensors 103 (e.g., GPS, inertial measure unit (IMU), LiDAR, radio detection and ranging (Radar), etc.) may also be exploited to make high definition digital maps. Processing ground sources generally requires more effort and resources to do a larger scale city level collection; however, ground sources can detect map features that are on the Earth's surface as well as traffic lights, signs, etc., which may not be visible from top-down images or sources. Moreover, the advent of less expensive systems (e.g., vehicle sensors 103) deployed on vehicles 101 at scale, has enabled crowd-sourced mapping and change detection to become increasingly feasible. However, the positional quality of the map features derived from such data is heavily dependent on the sensor system used for the data collection and the reliability on the number of such observations/passes. For high-definition map use (e.g., with centimeter level accuracy), correct sensor pose data is essential. In addition, crowd-sourced map and change detection data can result in tremendous volumes of data of often uncertain quality that can require considerable compute resources, time, and expense to effectively process. Accordingly, map service providers face significant technical challenges to automatically select the most appropriate sensor system before the corresponding data is utilized in connection with modern autonomous applications (e.g., autonomous driving).

To address these problems, the system 100 of FIG. 1 introduces an automatic way to select a sensor system based on its ability to infer the position and the number of observations required to achieve a certain amount of accuracy and reliability of semantic road features (e.g., lane markings, signs, etc.). In one embodiment, the most appropriate sensor system is the sensor system 103 that has the highest accuracy and reliability relative to the other available sensor systems 103. In other words, the most appropriate sensor system 103 has the minimalist error tolerance and spread around the error relative to the other available sensor systems 103. In one embodiment, the system 100 can automatically select the most appropriate sensor system 103 based on respective accuracy and/or reliability percentages as well as the kind of situations where the determined accuracy and reliability specifications are not met by a particular sensor system 103.

Figure 2:
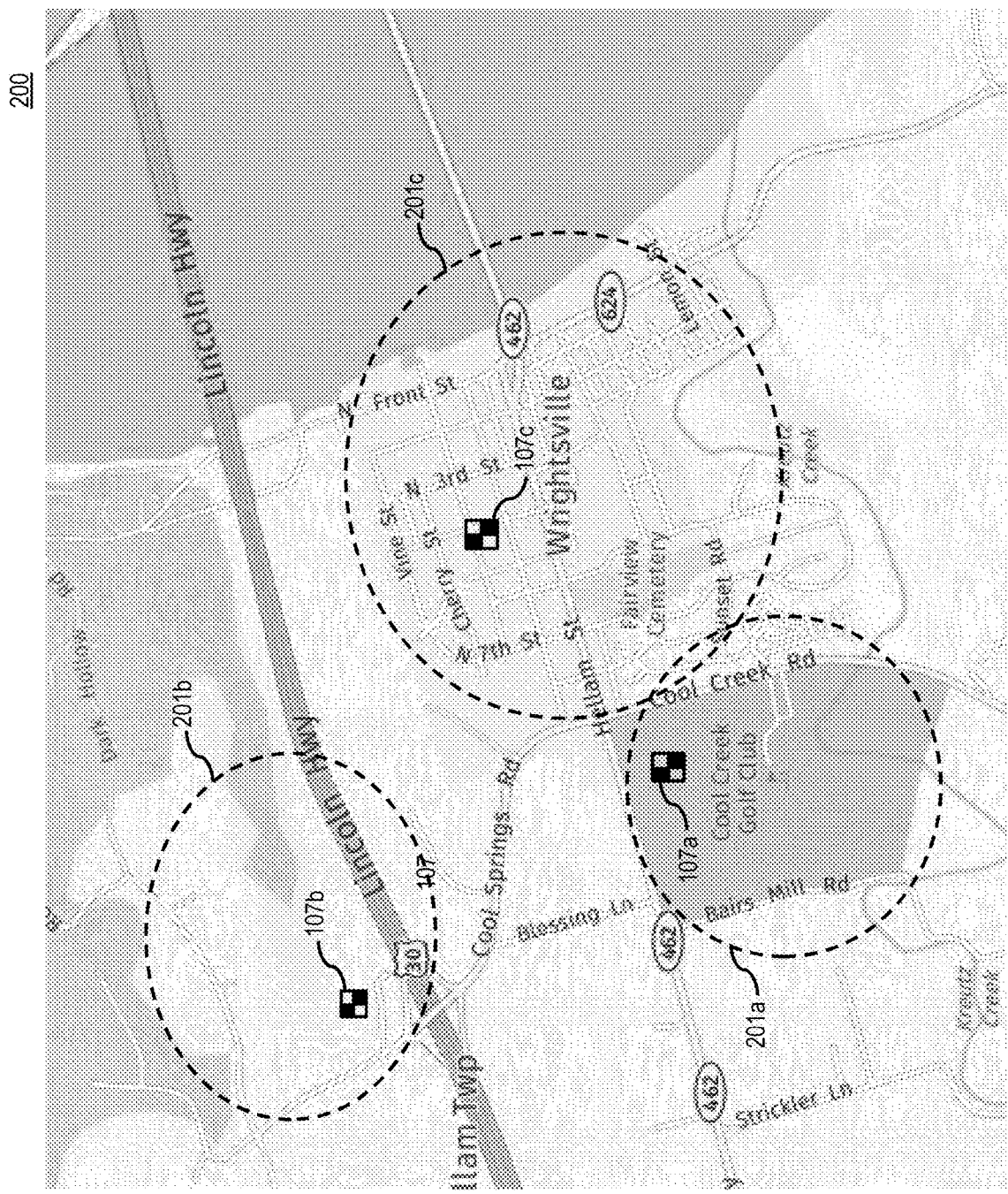
FIG. 2 is an example of a map including diverse geographical areas and known survey points, according to one embodiment.

In one embodiment, the system 100 obtains a set of survey points 107 (e.g., ground control points) among diverse geographical areas that involve, for instance, tree canopies (e.g., area 201*a*), open sky areas (e.g., area 201*b*), urban canyons (e.g., area 201*c*), natural canyons, etc., as depicted in the example map of FIG. 2. In one instance, the system 100 can obtain each survey point 107 from one or more vendor archives (e.g., a geographic database 109) via the communication network 111. For instance, to facilitate and/or monitor the accuracy of digital map data stored in the geographic database 109, one or more content providers 113*a*-113*m* (e.g., map service providers) can designate survey points 107 that have precise known location data associated with them (e.g., in the form of <Latitude, Longitude, Elevation>). These points play a vital role in being able to measure the quality of different sensor systems 103.

In one embodiment, the system 100 determines the relevant accuracy and reliability standards—error tolerance and the spread around the error (e.g., standard deviation) based on the intended automated application (e.g., autonomous driving) for which the selection of a sensor system 103 is being made. For example, the system 100 may require a higher degree of accuracy and reliability for ensuring safe automated driving functions, particularly in highly populated areas (e.g., area 201*c*) or at high speeds and/or the system 100 may require a relatively lower degree of accuracy and reliability for ensuring safe automated guidance functions (e.g., autonomous harvesting), particularly among vast acres of farmland (e.g., area 201*b*).

In one embodiment, the system 100 selects the sensor systems 103 (e.g., camera sensors, LiDAR sensors, Radar, infrared sensors, thermal sensors, and the like) for which the quality of capture poses needs to be estimated. In other words, the system 100 selects among the one or more sensor systems 103 for which the system 100 has access to the corresponding data (e.g., stored in or accessible via the geographic database 109). By way of example, the capture pose may include data on sensor position (e.g., location when the corresponding images were captured), sensor pose information (e.g., pointing direction), technical parameters (e.g., field of view, focal length, camera lens, etc.).

In one embodiment, for each sensor system (e.g., camera, LiDAR, etc.), the system 100 prompts one or more vehicles 101 (e.g., autonomous vehicles) with the respective sensor system 103 to drive around, within, etc., one or more areas (e.g., areas 201*a*, 201*b*, 201*c*) to capture each survey point 107. In one embodiment, the system 100 can also capture a survey point 107 using one or more user equipment (UE) 115*a*-115*n* (also collectively referred to herein as UEs 115) associated with a vehicle 101 (e.g., an embedded navigation system), a user or a passenger of a vehicle 101 (e.g., a mobile device, a smartphone, etc.), or a combination thereof using sensing systems like cameras and running perception algorithms on the acquired data (e.g., by executing one or more applications 117*a*-117*n*). In one instance, the vehicles 101, the vehicle sensors 103, the UE 115*s*, and the applications 117*a*-117*n* (also collectively referred to herein as applications 117) all have connectivity to the mapping platform 105 via the communication network 111.

In one embodiment, the system 100 collects all the captures (e.g., camera images) taken within a certain radius and marks the pixel position of the survey points 107 in each capture if the survey points 107 are visible (e.g., using the computer vision system 119). For example, the system 100 may obtain the captures from the geographic database 109. In one instance, for each capture that has a marked point, the system 100 generates a ray from the camera center to the pixel position in the case of an image sensor 103 and determines the distance of the ray from the 3D position of the survey point 107. In one embodiment, this distance is recorded as an error associated with the capture observation. In the case of LiDAR/Radar sensors, the system 100, for instance, identifies the point position of the survey point 107 in the cloud and measures the distance from it from the surveyed position to determine the error associated with the captured observation.

In one instance, the system 100 prompts the one or more vehicles 101 to make multiple passes to capture a survey point 107 multiple times and potentially under multiple conditions. Preferably, the one or more vehicles 101 capture each survey point 107 under different conditions, including multiple and varying speeds to obtain variation in the quality of the GPS signal and GPS/position cumulative drift.

In one embodiment, the system 100 plots the error associated with each capture observation on a curve and determines the mean/standard of deviation with respect to the number of passes. The system 100, in one instance, then correlates the number of passes on the curve with the specified error tolerance and spread (e.g., based on the autonomous application of interest). In one embodiment, the system 100 counts a survey point 107 as void if no number of passes can satisfy the required accuracy/reliability specifications.

In one embodiment, for each sensor system 103 (e.g., camera, IMU, LiDAR, Radar, etc.), the system 100 generates a histogram of passes needed to satisfy the relevant accuracy and reliability specifications using all the survey points 107. In one instance, the system 100 determines the mean number of passes and variation across the survey points 107 as well as the number of survey points 107 for which the specifications were not met. In one embodiment, the system 100 then compares the quality of the sensor systems 103 based on the mean number of passes and variation across survey points 107 to select or choose the most appropriate sensor system 103 based on the calculated statistics.

FIG. 2 is an example of a map including diverse geographical areas and known survey points, according to one embodiment. In this example, the map 200 includes diverse geographical areas including, for instance, tree canopies (201a), open sky areas (201b), and urban canyons (201c) and each of the areas 201a-201c includes at least one survey point 107 (e.g., 107a, 107b, and 107c) with a known quality/accuracy (e.g., a physically verified location). Consequently, one or more vehicles 101 can drive around the respective areas to obtain one or more captures (e.g., camera images) of the respective survey points 107 in diverse geographical conditions. It is contemplated that the diverse geographic areas contribute to variations in the quality of the captures which the system 100 can consider when comparing the quality of the sensor system 103.

Figure 3:
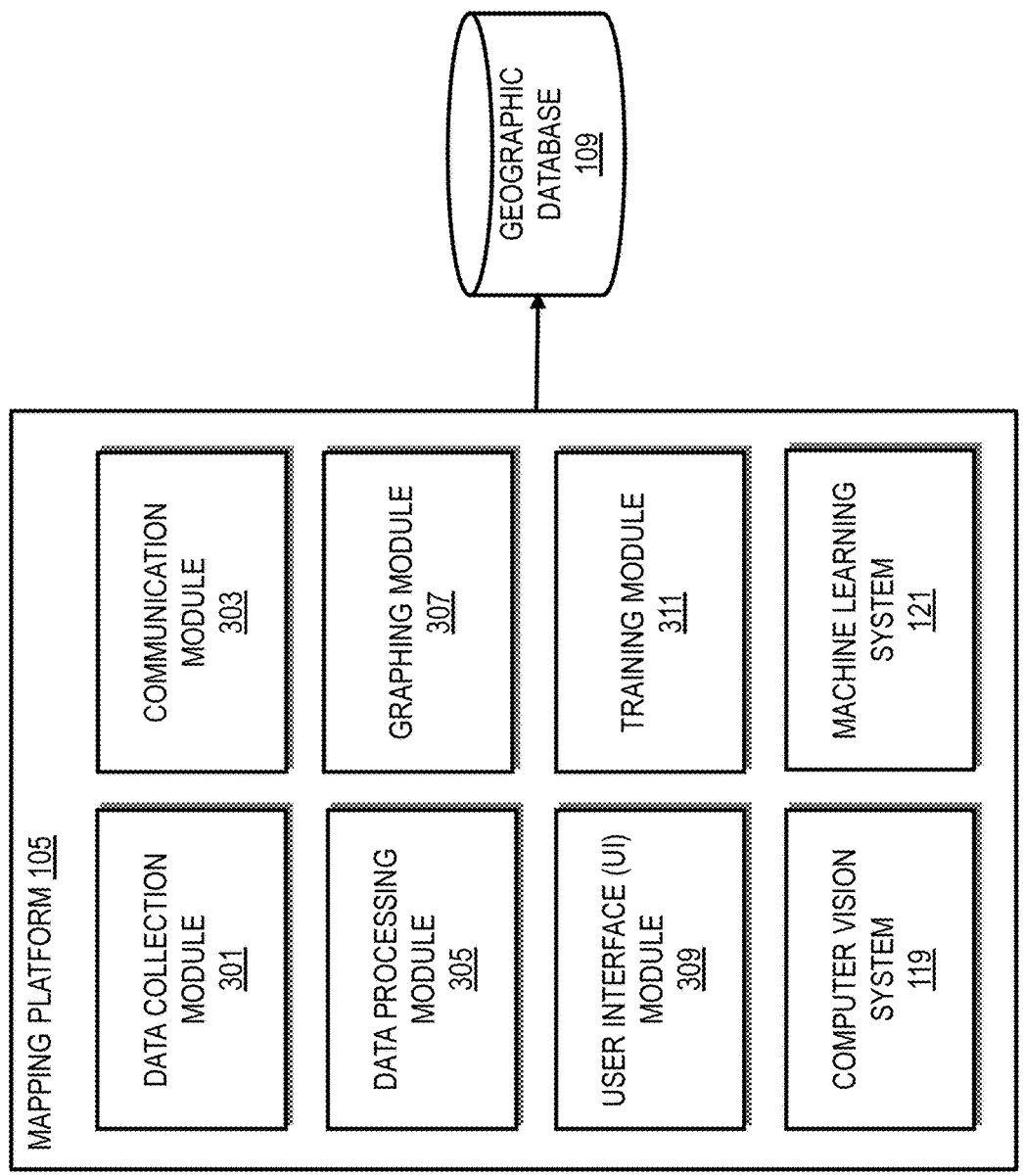
FIG. 3 is a diagram of components of a mapping platform capable of automatically selecting the most appropriate sensor system for high-definition map feature accuracy and reliability specifications, according to one embodiment.

FIG. 3 is a diagram of the components of the mapping platform 105, according to one embodiment. By way of example, the mapping platform 105 includes one or more components for automatically selecting the most appropriate sensor system 103 for high-definition map feature accuracy and reliability specifications, according to the various embodiments described herein. It is contemplated that the functions of these components may be combined or performed by other components of equivalent functionality. In one embodiment, the mapping platform 105 includes a data collection module 301, a communication module 303, a data processing module 305, a graphing module 307, a user interface (UI) module 309, a training module 311, a computer vision system 119, and a machine learning system 121, all with connectivity to the geographic database 109. The above presented modules and components of the mapping platform 105 can be implemented in hardware, firmware, software, or a combination thereof. Though depicted as a separate entity in FIG. 1, it is contemplated that the mapping platform 105 may be implemented as a module of any other component of the system 100. In another embodiment, the mapping platform 105 and/or the modules 301-311 may be implemented as a cloud-based service, local service, native application, or combination thereof. The functions of the mapping platform 105 and/or the modules 301-311 are discussed with respect to FIGS. 4 and 5.

Figure 4:
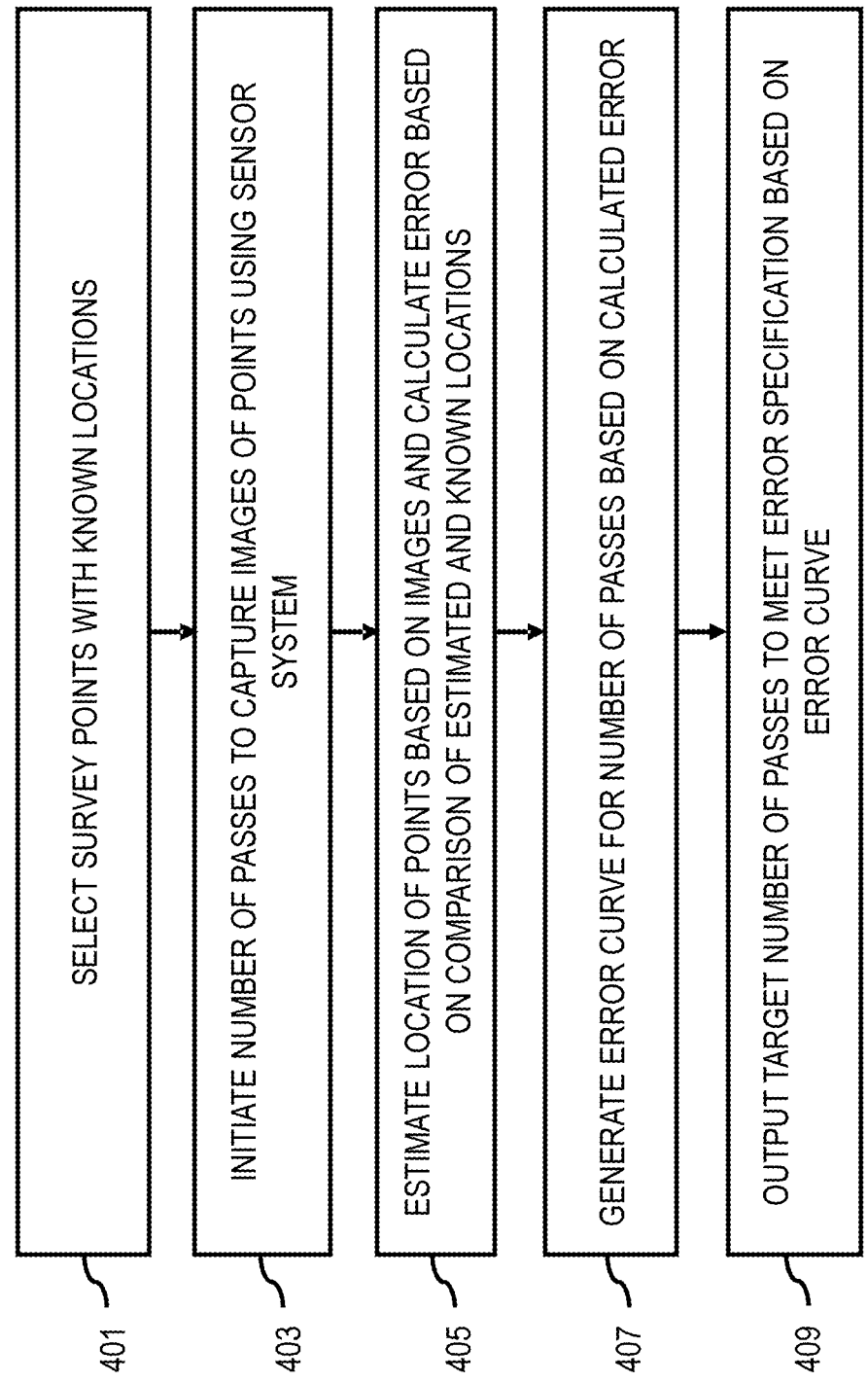
FIG. 4 is a flowchart of a process for automatically selecting the most appropriate sensor system for high-definition map feature accuracy and reliability specifications, according to one embodiment.
Figure 9:
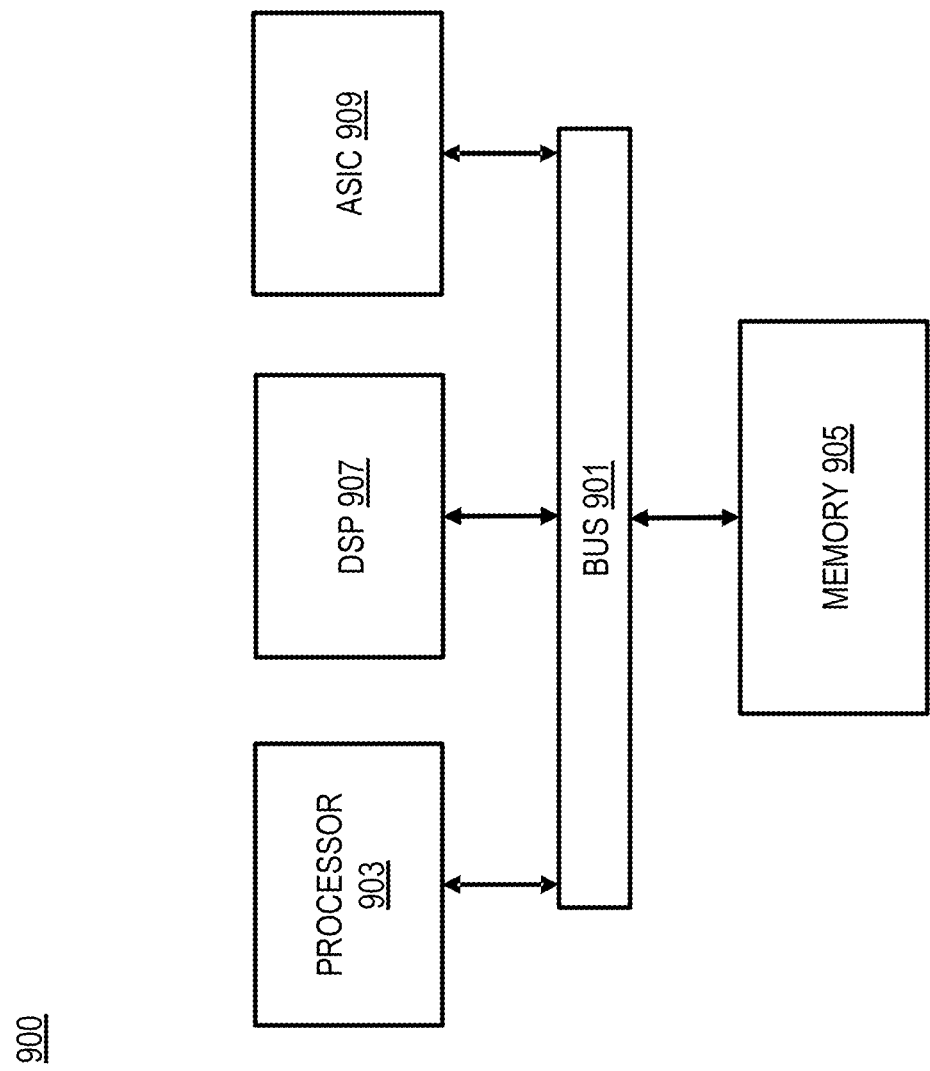
FIG. 9 is a diagram of a chip set that can be used to implement an embodiment.

FIG. 4 is a flowchart of a process for automatically selecting the most appropriate sensor system for high-definition map feature accuracy and reliability specifications, according to one embodiment. In various embodiments, the mapping platform 105, the computer vision system 119, the machine learning system 121, and/or any of the modules 301-311 may perform one or more portions of the process 400 and may be implemented in, for instance, a chip set including a processor and a memory as shown in FIG. 9. As such, the mapping platform 105, the computer vision system 119, the machine learning system 121, and/or the modules 301-311 can provide means for accomplishing various parts of the process 400, as well as means for accomplishing embodiments of other processes described herein in conjunction with other components of the system 100. Although the process 400 is illustrated and described as a sequence of steps, its contemplated that various embodiments of the process 400 may be performed in any order or combination and need not include all the illustrated steps.

In step 401, the data collection module 301 selects at least one survey point that has a known physical location. In one embodiment, the known physical locations of the one or more survey points 107 may be determined by survey techniques, queried from digital map data (e.g., stored in or accessed via the geographic database 109), and/or any other equivalent technique. In one instance, the known location is based on precise location data (e.g., in the form of <Latitude, Longitude, Elevation>). Examples of survey points with known physical locations, include, but are not limited to, ground control points which have identifiable physical features whose locations have been precisely surveyed. In one embodiment, a survey point 107 may refer to any feature that is identifiable by a vehicle sensor 103 (e.g., a camera sensor, LiDAR, Radar, etc.), a UE 115, or a combination thereof such as physical feature on the ground and/or common road furniture (e.g., ground paint, signs, poles, traffic lights, etc.). In other words, it is contemplated that survey points 107 refer to a broader category of features than just ground control points.

In step 403, the communication module 303 initiates a plurality of passes (e.g., by a vehicle 101) to capture a plurality of images of the at least one survey point 107 using a sensor system 103. By way of example, the communication module 303 may initiate the plurality of passes by transmitting one or more commands or prompts to one or more vehicles 101, one or more drivers of the vehicles 101, or a combination thereof via a UE 115, an application 117, or a combination thereof.

In one embodiment, the plurality of images including the at least one survey point 107 are captured by one or more vehicles 101 (e.g., autonomous vehicles) including one or more vehicle sensors 103 (e.g., GPS, IMU, camera, LiDAR, Radar, etc.) while the one or more vehicles 101 drive or travel in the geographic area including the survey points 107. In one instance, the plurality of images may also be captured by one or more UE 115 (e.g., a mobile device) associated with a vehicle 101 and/or a driver or passenger of the vehicle 101. In one embodiment, the communication module 303 transmits the one or more commands or prompts in such a way that the plurality of passes are performed under one or more different temporal and/or contextual conditions. For example, the different conditions may include passes by the one or more vehicles 101 at multiple and varying vehicle speeds, at different times of the day and/or night, during different weather conditions (e.g., sunny, rainy, foggy, snowing, etc.), or a combination thereof.

In step 405, for each pass of the plurality of passes, the data processing module 305 calculates an estimated location of the at least one survey point 107 based on the plurality of images and calculates error data based on the estimated location and the known physical location. By way of example, each pass of a survey point 107 by a vehicle 101 (e.g., an autonomous vehicle) using one or more vehicle sensors 103 (e.g., camera, LiDAR, etc.) in a geographic area (e.g., areas 201a, 201b, 201c) will likely generate a number of captures (e.g., camera images) of a survey point 107. In one embodiment, if the data processing module 305 knows the location of the vehicle sensor 103 that generated the capture, the data processing module 305 can use one or more mathematical principles, for example, to estimate the location of the captured survey point 107. In one instance, the data processing module 305 can also calculate the amount of the error associated with the estimated location and the vehicle sensor 103.

In one embodiment, wherein the sensor system 103 includes a camera system, the data processing module 305 can determine the estimated location of each survey point 107 based on a ray generated from a location of the camera system 103 used to capture each image through a pixel location on an image plane of the plurality of images. In one instance, the data processing module 305 can determine the location of the camera system 103 from image metadata or other data associated with each image (e.g., stored in the geographic database 109). In one embodiment, the data processing module 305 determines the location of the camera system 103 within in a common coordinate system (e.g., a global or a real-world coordinate system indicating <Latitude, Longitude, Elevation>).

In one embodiment, the data processing module 305 can use the camera pose data and/or camera technical specifications (e.g., focal length, camera lens, aperture, exposure, etc.), for instance, to locate a physical location of an image plane for each capture (e.g., camera image) within the common coordinate system. The image plane refers to the apparent location in three-dimensional space of the image, thereby enabling the data processing module 305 to translate each pixel location (including feature-labeled or detected pixel locations) in an image of each survey point 107 (if visible) into the common coordinate system. In one instance, the data processing module 305 projects a ray (e.g., a line or line segment) from the physical location of the camera system 103 location through the image plane at the marked or labeled pixel location corresponding to the survey point to calculate the estimated location of the captured survey point 107. By way of example, a labeled pixel is a pixel annotated or marked by a labeler (e.g., a human labeler) as corresponding to a feature of interest (e.g., a survey point 107), and a detected pixel is a pixel determined by a computer system (e.g., the computer vision system 119 using machine learning) to be classified as corresponding to a feature of interest.

In one embodiment, the plurality of images can be labeled with one or more survey points 107 that are identifiable in the images. Labeling, for instance, refers to identifying pixels or groups of pixels in the images that correspond to the captured survey points 107, typically but not necessarily by a human. In addition or alternatively, the pixels corresponding to a survey point 107 in an image can be detected by automated machine processes. For example, the data collection module 301 can detect any map feature that is visible in ground-level imagery (or imagery from any perspectives or views of interest). The data collection module 301 can use, for instance, the computer vision system 119 in combination with the machine learning system 121 (e.g., a neural network or equivalent) to recognize the pixels of images that correspond to the visible survey points 107. For example, the known survey points 107 can include but are not limited to intersection-related features, which are generally visible in both top-down and ground-level images. While any kind of visible features can be used according to the embodiments described herein, intersection-related features (e.g., curvilinear geometry intersection features) are particularly suited for automated identification (e.g., via the computer vision system 119) because they exhibit the following properties: (1) have a consistent definition; (2) are uniquely identifiable; (3) have spatial sparsity; and/or (4) are generalizable across different geographic areas (e.g., areas 201*a*-201*c*).

In one embodiment, the data processing module 305 calculates the distance between the projected ray and the corresponding survey point 107 wherein the distance represents the error between the estimated location and the known physical location of the survey point 107. In one instance, the data processing module 305 can map the true location of a known survey point 107, using the known physical location of the survey point in the common coordinate system (e.g., the real-world location given by <Latitude, Longitude, Elevation> or equivalent). The data processing module 305 can then compute the minimum perpendicular distance between the true location of the survey point 107 and the corresponding ray. In other words, the minimum perpendicular distance represents the calculated error or error data between the estimated location and the actual location for each pass.

In one embodiment, wherein the sensor system 103 includes a LiDAR system or a Radar system, the data processing module 305 can similarly determine the estimated location of each survey point 107, except in these instances, the point position is within a point cloud generated by the LiDAR or Radar system 103 rather than on an image plane as described above.

In step 407, the graphing module 307 generates an error curve with respect to a number of the plurality of passes based on the error data for said each pass. By way of example, each pass of a survey point 107 by a vehicle 101 (e.g., with a camera sensor 103) may generate multiple images of the survey point 107 (e.g., image A, image B, and image C). The images A-C may be taken by one or more vehicles 101 at the same location under the same or similar conditions, at different locations under different conditions, or a combination thereof. As described above, the data processing module 305 can calculate an estimated location of the survey point (e.g., estimated survey point location A, estimated survey point location B, and estimated survey point location C) for each image of each pass (e.g., passes 1-3) as well as the error associated with each estimate and each pass (e.g., errors 1A, 1B, 1C, 2A, 2B, 2C, and 3A, 3B, and 3C). In one embodiment, the graphing module 207 can plot the various error values on a curve wherein the x-axis represents, for instance, the number of passes by a survey point 107 and the y-axis represents, for instance, the degree of error between the estimated location and the actual location. In one instance, it is contemplated that under uniform conditions, the curve plotted by the graphing module 307 would represent a downward slope left to right such that the degree of error would decrease as a vehicle 101 made more passes of the survey point 107. In one embodiment, the error data includes a mean, a standard deviation, of a combination thereof of an error between the estimated location and the known location for said each pass.

In step 409, the UI module 309 provides an output indicating a target number of passes to meet an error specification based on the error curve. By way of example, the output may be a visual representation in an application 117 of the target passes for each sensor system 103. In one embodiment, the target number of passes is selected based on a target error tolerance, a target error spread, or a combination thereof. By way of example, the target error tolerance or spread may be based on the autonomous application and/or context under consideration. For example, the digital maps used for autonomous driving in a busy urban center may require a much higher tolerance than the digital maps used for autonomous driving in the countryside. Likewise, the digital maps used for autonomous driving may require a much higher tolerance than the digital maps for autonomous guidance (e.g., farming and/or harvesting).

In one embodiment, the graphing module 307 can generate a histogram of the number of the plurality of passes that meets the error specification using all the survey points (e.g., in a geographic area). In other words, the graphing module 307 can visually represent the frequency of passes (e.g., along the x-axis) relative to the error specification (e.g., along the y-axis). In one embodiment, the UI module 309 can output the histogram (e.g., via an application 117) so that a user can quickly assess the accuracy or quality of each sensor system 103 and then select the most appropriate sensor system 103 for the high-definition map feature accuracy and reliability specifications. In one instance, the graphing module 307 can also generate a histogram of the mean number of the plurality of passes across one or more of the at least one survey point 107.

In one embodiment, the UI module 309 in connection with the data processing module 305 can provide an output indicating a number of the survey points for which the error specification is not met. In other words, the data processing module 305 can identify the accuracy and reliability percentages of the various sensor systems 103 as well as the kinds of situations where accuracy and reliability specifications are not met. For example, the crowd-sourced mapping data from a camera sensor system 103 in inclement weather conditions at high speed may not satisfy the accuracy and reliability specifications irrespective of the number of passes made by the camera sensor system 103.

In one embodiment, the data processing module 305 interacts with the training module 311 and the machine learning system 121 to automatically compare or select the sensor system 103 in relation to another sensor system 103 based on the error curve. In one embodiment, the training module 311 can continuously provide and/or update a machine learning model (e.g., a support vector machine (SVM), a neural network, decision tree, etc.) of the machine learning system 121 during training using, for instance, supervised deep convolution networks or equivalents. In other words, the training module 311 trains a machine learning model using the various inputs to enable the machine learning system 121 to automatically compare the quality of sensor systems 103 based on accuracy and reliability specifications. Generally, a machine learning model (e.g., a neural network) is trained to manipulate an input feature set to make a prediction about the feature set or the phenomenon/observation that the feature set represents. In one embodiment, the training features for the machine learning model include the applicable accuracy and reliability standards, number of passes made in relation to one or more survey points 107, conditions during which the passes were made, sensor systems 103 used in the capturing of the survey points 107, survey points 107 for which the error specification was not met, and the corresponding error curves. In one embodiment, the machine learning system 121 can consequently predict the accuracy and reliability percentages for the various sensor systems 103 and the kinds of situations where accuracy and reliability specifications will not be met.

Figure 5:
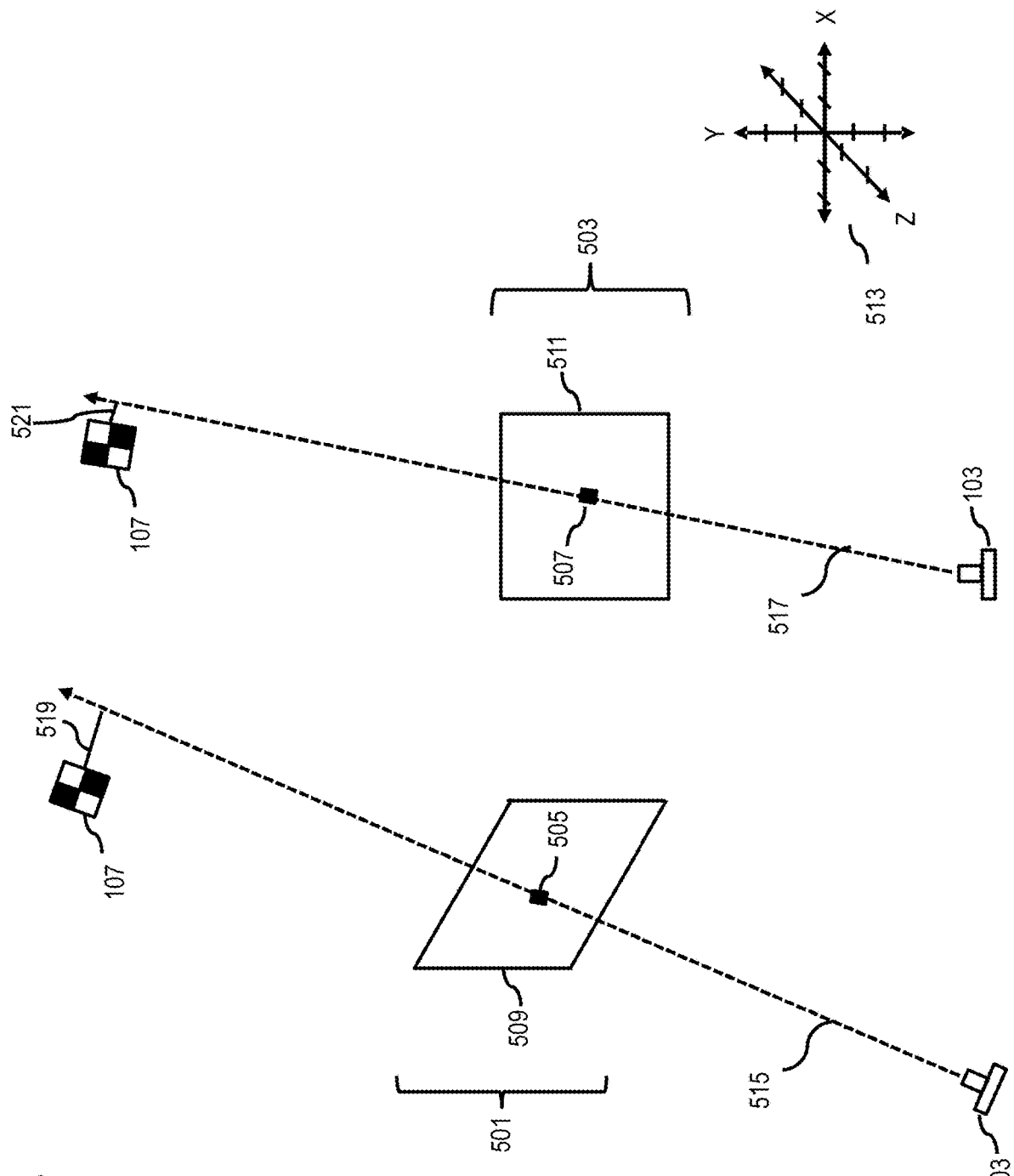
FIG. 5 is a diagram illustrating an example of rays projected to estimate the location of a captured survey point and to determine the error associated with the capture observation, according to one embodiment.

FIG. 5 is a diagram illustrating an example of rays projected to estimate the location of a captured survey point and to determine the error associated with the capture observation, according to one embodiment. As shown in the example of FIG. 5, images 501 and 503 are processed to estimate the location of the captured survey point 107 having a known physical location (e.g., in the form of <Latitude, Longitude, Elevation>).

In one embodiment, the images 501 and 503 are derived from passes of the survey point 107 by one or more vehicles 101 (e.g., an autonomous vehicle) with one or more vehicle sensors 103 (e.g., camera, LiDAR, Radar, etc.). In this example, the images 501 and 503 are captured using a camera sensor 103 and represent all the captures of the survey point 107 within a certain radius. In one instance, the pixel positions 505 and 507 corresponding to the survey point 107 are marked (e.g., by a human) with respect to the images 501 and 503, respectively. In one instance, the mapping platform 105 uses the pose data and/or camera parameters of the camera system 103 to determine the physical location of the image planes 509 and 511 (e.g., corresponding to images 501 and 503, respectively), which represent the location and orientation of the images 501 and 503 with respect to the coordinate system 513.

In one embodiment, for each labeled or detected pixel location 505 and 507 of the images 501 and 503, the mapping platform 105 generates rays 515 and 517 originating from the center of the camera sensor 103 through each of the labeled or detected pixel locations 505 and 507. To determine the accuracy of the estimated survey point locations, the mapping platform 105 can iteratively evaluate the closeness between rays 515 and 517 and the known location of the survey point 107. In one instance, the mapping platform 105 determines the closeness value by computing line segments 519 and 521 between the known location of the survey point 107 and the rays 515 and 517, respectively. As shown, the line segments 517 and 519 are drawn orthogonal to the known location of the survey point 107. In one embodiment, this orthogonality helps ensure that the line segments 519 and 521 are the shortest or minimum distance between the rays 515 and 517 and the known location of the survey point 107.

In one embodiment, the minimum perpendicular distances 519 and 521 between the known location of the survey point 107 and the rays 515 and 517 represent the error associated with the capture observation. In one instance, the minimum perpendicular distances can be aggregated using different measures of central tendency (e.g., mean, median, mode, and so forth). In another embodiment, a weighting scheme based on an inverse distance of the survey point 107 to the center of each camera sensor 103 could also be used since the confidence in observing a physical point by a camera 103 changes inversely as a function of the distance from the capture.

As described above, the mapping platform 105 can provide an aggregation of error data indicating the quality of the data of the sensor system 103 relative to the number of passes. In one embodiment, the mapping platform 105 can calculate the deviation of the aggregate error data to provide an output (e.g., a histogram) associated with the quality of the sensor system 103. In one embodiment, the mapping platform 105 can count as void if no number of passes can satisfy an error threshold. In one instance, the mapping platform 105 can access the error threshold stored in or accessible via the geographic database 109.

Figure 6A:
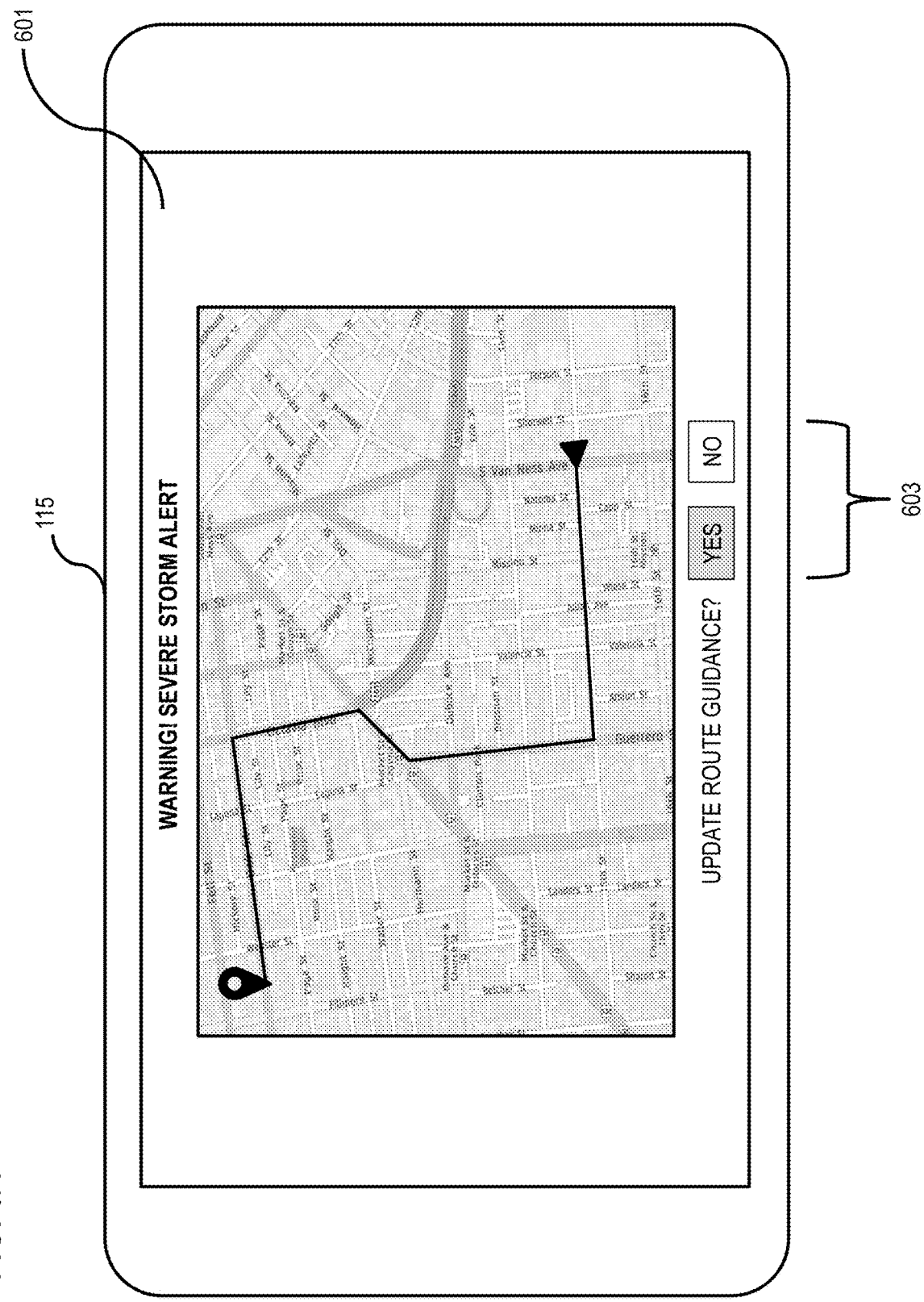
FIGS. 6A-6C are diagrams of example user interfaces for automatically selecting the most appropriate sensor system for high-definition map feature accuracy and reliability specifications, according to one embodiment.
Figure 6B:
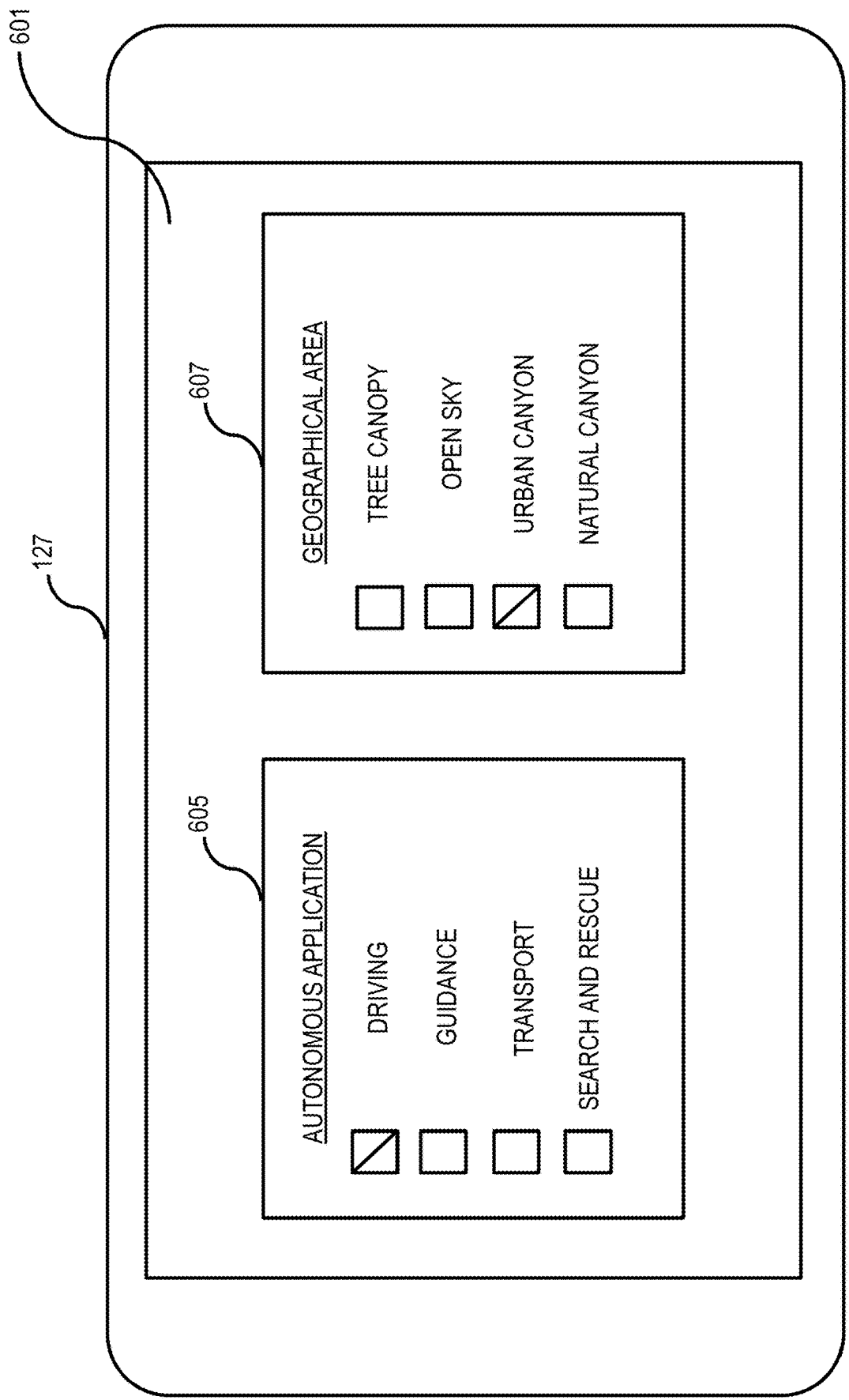
Figure 6C:
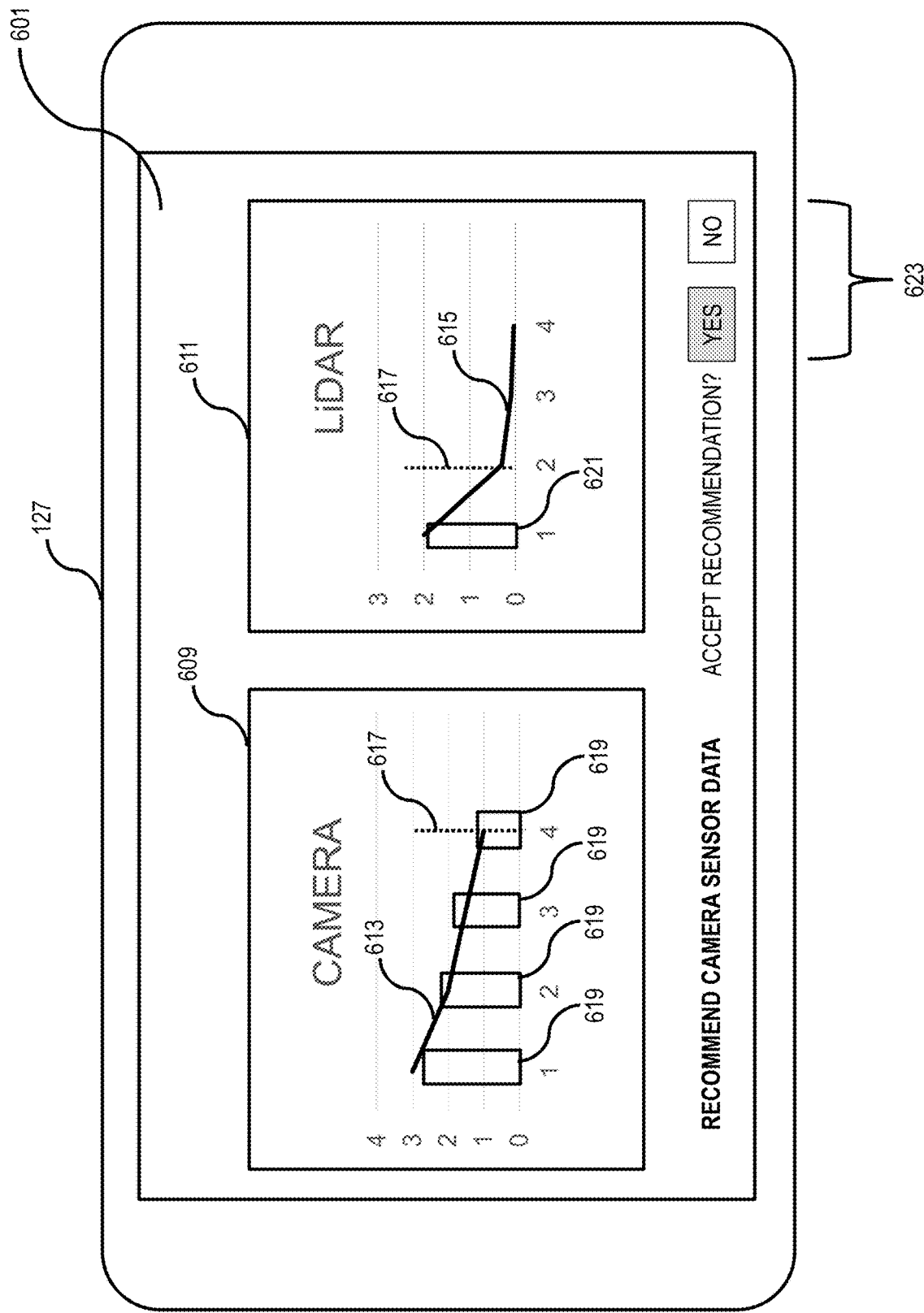

FIGS. 6A-6C are diagrams of example use interfaces for automatically selecting the most appropriate sensor system based on high-definition map feature accuracy and reliability specifications, according to one embodiment. In this example, a UI 601 is generated for a UE 115 (e.g., an embedded navigation system) associated with an autonomous vehicle 101 that can enable a user (e.g., a passenger) to access one or more applications 117 (e.g., a navigation application, an analytics application, etc.) while traveling through a large metropolitan city (e.g., San Francisco).

Referring to FIG. 6A, in one embodiment, the system 100 can notify or alert the user via the UI 601 that a severe storm warning has been issued that will likely affect traffic, path planning, estimated time of arrival, etc. By way of example, the system 100 may receive the notification from a services platform 123 (e.g., an OEM platform) including one or more services 125a-125n (also collectively referred as services 125) (e.g., a weather service), a content provider 113, or a combination thereof. As previously described above, safe and effective path planning, particularly for autonomous vehicles, requires knowledge of what to expect beyond a vehicle's perceptual horizon and driving in complicated urban environments with many occluding requires a knowledge of what cannot be seen.

In one instance, the system 100 can generate the UI 601 such that it includes an input 603 to enable a user to update the route guidance or path planning based on the most accurate and/or up-to-date mapping data (e.g., crowd-sourced data based on current weather conditions). However, as described above, it is important for the user to know the accuracy and reliability of such data before the data is utilized (e.g., in a navigation application 117) to make changes to one or more map features. Specifically, the positional quality of the map features derived from sensor data is heavily dependent on the sensor system 103 (e.g., GPS, IMU, camera, LiDAR, Radar, etc.) used for the data collection and the reliability on the number of such observations/passes. By way of example, the user can interact with the input 603 via one or more physical interactions (e.g., a touch, a tap, a gesture, typing, etc.), one or more voice commands (e.g., "yes," "update route guidance," etc.), or a combination thereof.

In one embodiment, the system 100 can generate the UI 601 such that it includes a series of inputs (e.g., inputs 605 and 607) that enable a user input various contextual characteristics or values so that the system 100 can filter among the various types of available sensor system data (e.g., via the communication network 111) to reduce the computational resources and time needed for comparing vast amounts of data, as depicted in FIG. 6B. In this example, the input 605 enables the user to select among various relevant autonomous activities (e.g., driving, guidance, transport, search and rescue, etc.) and the input 607 enables the user to select among various diverse geographic areas (e.g., tree canopy, open sky, urban canyon, natural canyon, etc.). In this example, the user has selected "driving" and "urban canyon." By way of example, in one embodiment, the inputs 605 and 607 have the same or similar functionality as the inputs 603 in terms of a user's ability to input information. In one instance, it is contemplated, that the system 100 can automatically detect the applicable autonomous application and/or geographic area when the safety of the autonomous vehicle 101, passengers, and/or other persons or vehicles in the area reaches a certain threshold.

Referring to FIG. 6C, in one embodiment, the system 100 can generate the UI 601 such that it includes one or more outputs (e.g., charts 609 and 611) indicating a target number of passes to satisfy an error specification (e.g., accuracy and reliability standards) based on the error curve of that sensor system 103 as described in the embodiments above. In this example, the chart 609 represents the target number of passes for a camera sensor system 103 as shown by the error curve 613 and the chart 611 represents the target number of passes for a LiDAR sensor system 103 as shown by the error curve 615. Specifically, the y-axis of each chart 609 and 611 represents the amount of error associated with the capture observation and the x-axis represents the number of passes. With respect to autonomous driving as indicated by the user in FIG. 6B, the system 100 can determine that the number of passes corresponding to an error value equal to or less than one (1) (as shown by the dotted line 617) is required to meet the accuracy and reliability standards or specifications. In this example, four (4) passes are required with respect to the camera sensor system 103 and two (2) passes are required with respect the LiDAR sensor system 103.

In one embodiment, the system 100 can also generate the outputs 609 and 611 so that they include visual representations of the number of passes corresponding to the available crowd-sourced data so that the system 100 and/or the user can quickly compare and/or select the most appropriate sensor system 103 based on the calculated statistics. For example, in this instance, the available crowd-sourced camera sensor data includes four pass data (as depicted by the columns 619) whereas the available crowd-sourced LiDAR sensor data only includes one pass data (as depicted by the column 621). Thus, while LiDAR sensor data is generally considered more accurate relative to camera sensor data, in this instance, the crowd-sourced camera sensor data meets the accuracy and reliability requirements whereas the crowd-sourced LiDAR data does not (i.e., the camera sensor system is the most appropriate sensor system 103 in this context). In one embodiment, the system 100 can generate the UI 601 such that it presents the automatically selected sensor system 103 as a recommendation, or a prompt based on the system 100's comparison of the quality of sensor systems 103. In one instance, the system 100 can also generate the UI 601 such that it includes an input 623 to enable the user to accept or reject the recommendation of the system 100. By way of example, in the case of a severe storm as described above where the conditions may negatively impact the accuracy of the captured observations, the user may want to reject the recommendation of the system 100 and to accept the LiDAR sensor data or to determine whether other any other sensor data is available (e.g., Radar, etc.). Again, it is contemplated that in certain circumstances, where the safety of the autonomous vehicle 101, the passenger, or persons or vehicles nearby reaches a certain threshold, the system 100 may automatically select the most appropriate sensor system and corresponding data to update the guidance and/or path planning to ensure the safety of the autonomous vehicle 101, the passenger, and/or any nearby persons or vehicles.

Returning to FIG. 1, in one embodiment, the mapping platform 105 performs the process for automatically selecting the most appropriate sensor system based on high-definition map feature accuracy and reliability specifications as discussed with respect to the various embodiments described herein. For example, with respect to autonomous driving, transportation, guidance, search and rescue, and/or other similar applications, the mapping platform 105 can compare the quality of capture pose data based on the number of passes required to satisfy set error tolerance and spread requirements.

In one embodiment, the machine learning system 121 of the mapping platform 105 includes a neural network or other machine learning system to compare or select sensor systems 103 (e.g., camera, LiDAR, Radar, etc.) for high-definition map feature accuracy and reliability specifications and/or identify kinds of situations where such specifications are not met. For example, when the inputs to the machine learning model are histograms of the passes needed to satisfy the accuracy and reliability standards, the output can include one or more recommended sensor systems 103 and corresponding map data for changing and/or updating high definition digital maps. In one embodiment, the neural network of the machine learning system 121 is a traditional convolutional neural network which consists of multiple layers of collections of one or more neurons (which are configured to process a portion of an input data).

In one instance, the machine learning system 121 and/or the computer vision system 119 also have connectivity or access over the communication network 111 to the geographic database 109 which can store the accuracy and reliability standards, error curves, mean/standard of deviation with the numbers of passes, etc. for each sensor system 103.

In one embodiment, the mapping platform 105 has connectivity over the communication network 111 to the services platform 123 (e.g., an OEM platform) that provides the services 125. By way of example, the services 125 may be third party services and include mapping services, navigation services, travel planning services, notification services, social networking services, content (e.g., audio, video, images, etc.) provisioning services, application services, storage services, contextual information determination services, location-based services, information based services (e.g., weather, news, etc.), etc. In one embodiment, the services 125 use the output of the mapping platform 105 (e.g., recommended sensor system 103) to provide up-to-date services 125 such as navigation, mapping, other location-based services, etc.

In one embodiment, the mapping platform 105 may be a platform with multiple interconnected components. The mapping platform 105 may include multiple servers, intelligent networking devices, computing devices, components and corresponding software. In addition, it is noted that the mapping platform 105 may be a separate entity of the system 100, a part of the one or more services 125, a part of the services platform 123, or included within a UE 115 and/or a vehicle 101.

In one embodiment, the content providers 113 may provide content or data (e.g., geographic data, parametric representations of mapped features, global or a real-world coordinate system data indicating <Latitude, Longitude, Elevation> for one or more survey points, 107 etc.) to the vehicles 101, the mapping platform 105, geographic database 109, the UEs 115, the applications 117, the services platform 123, and/or the services 125. The content provided may be any type of content, such as map content, survey data, textual content, audio content, video content, image content, etc. In one embodiment, the content providers 113 may provide content that may aid in the detecting and locating of survey points 107, road furniture (e.g., ground paint, signs, poles, traffic lights, etc.), and/or other relevant features. In one embodiment, the content providers 113 may also store content associated with the vehicles 101, the mapping platform 105, the geographic database 109, the UEs 115, the computer vision system 119, the machine learning system 121, the services platform 123, and/or the services 125. In another embodiment, the content providers 113 may manage access to a central repository of data, and offer a consistent, standard interface to data, such as a repository of the geographic database 109.

In one embodiment, a UE 115 (e.g., a mobile device) and/or a vehicle 101 (e.g., an autonomous vehicle) may execute a software application 117 to capture image data or other observation data of one or more survey points 107 for automatically selecting the most appropriate sensor system 103 according to the embodiments described herein. By way of example, the applications 117 may also be any type of application that is executable on a UE 115 and/or a vehicle 101, such as autonomous driving applications, mapping applications, analytical applications (e.g., visually graphing and/or comparing), location-based service applications, navigation applications, content provisioning services, camera/imaging applications, media player applications, social networking applications, calendar applications, and the like. In one embodiment, the applications 117 may act as a client for the mapping platform 105 and perform one or more functions associated with automatically selecting a sensor system 103 alone or in combination with the machine learning system 121.

By way of example, the UEs 115 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 115 can support any type of interface to the user (such as "wearable" circuitry, etc.). In one embodiment, a UE 115 may be associated with a vehicle 101 (e.g., a mobile device) or be a component part of the vehicle 101 (e.g., an embedded navigation system).

In one embodiment, the vehicles 101 are configured with various sensors 103 for generating or collecting images or representations of one or more survey points 107 (e.g., for processing by the mapping platform 105), related geographic data, etc. Although the vehicles 101 are depicted as automobiles, it is contemplated that the vehicles 101 may be any type of vehicle capable of including one or more sensors 103 (e.g., a car, a truck, a motorcycle, a bike, a scooter, etc.). In one embodiment, the sensed data represents sensor data associated with a geographic location or coordinates at which the sensor data was collected. By way of example, the vehicle sensors 103 may include GPS for gathering location data, IMU data (e.g., for understanding the motion of a vehicle 101 during a capture), LIDAR, Radar, a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture survey points or ground control point imagery, etc. for analysis), an audio recorder for gathering audio data, velocity sensors mounted on steering wheels of the vehicles, switch sensors for determining whether one or more vehicle switches are engaged, and the like. In one embodiment, the GPS sensors 103 may be used to determine GPS/position cumulative drift of a vehicle 101.

Other examples of sensors of the UEs 115 and/or the vehicles 101 (e.g., sensors 103) may include light sensors, orientation sensors augmented with height sensors and acceleration sensor (e.g., an accelerometer can measure acceleration and can be used to determine orientation of the vehicle), tilt sensors to detect the degree of incline or decline of a vehicle 101 along a path of travel, moisture sensors, pressure sensors, etc. In a further example embodiment, sensors about the perimeter of a vehicle 101 may detect the relative distance of a vehicle 101 from a lane or roadway, the presence of other vehicles, pedestrians, traffic lights, potholes and any other objects, or a combination thereof. In one scenario, the sensors may detect weather data, traffic information, or a combination thereof. In one embodiment, a UE 115 and/or a vehicle 101 may include GPS or other satellite-based receivers to obtain geographic coordinates from one or more satellites 127 for determining current location and time. Further, the location of a vehicle 101, a vehicle sensor 103, and/or a UE 115 can be determined by visual odometry, triangulation systems such as A-GPS, Cell of Origin, or other location extrapolation technologies. In yet another embodiment, one or more sensors can determine the status of various control elements of a vehicle 101, such as activation of wipers, use of a brake pedal, use of an acceleration pedal, angle of the steering wheel, activation of hazard lights, activation of head lights, etc.

In one embodiment, the communication network 111 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 101, vehicle sensors 103, mapping platform 105, content providers 113, UEs 115, applications 117, computer vision system 119, machine learning system 121, services 125, services platform 123, and/or satellites 127 communicate with each other and other components of the system 100 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
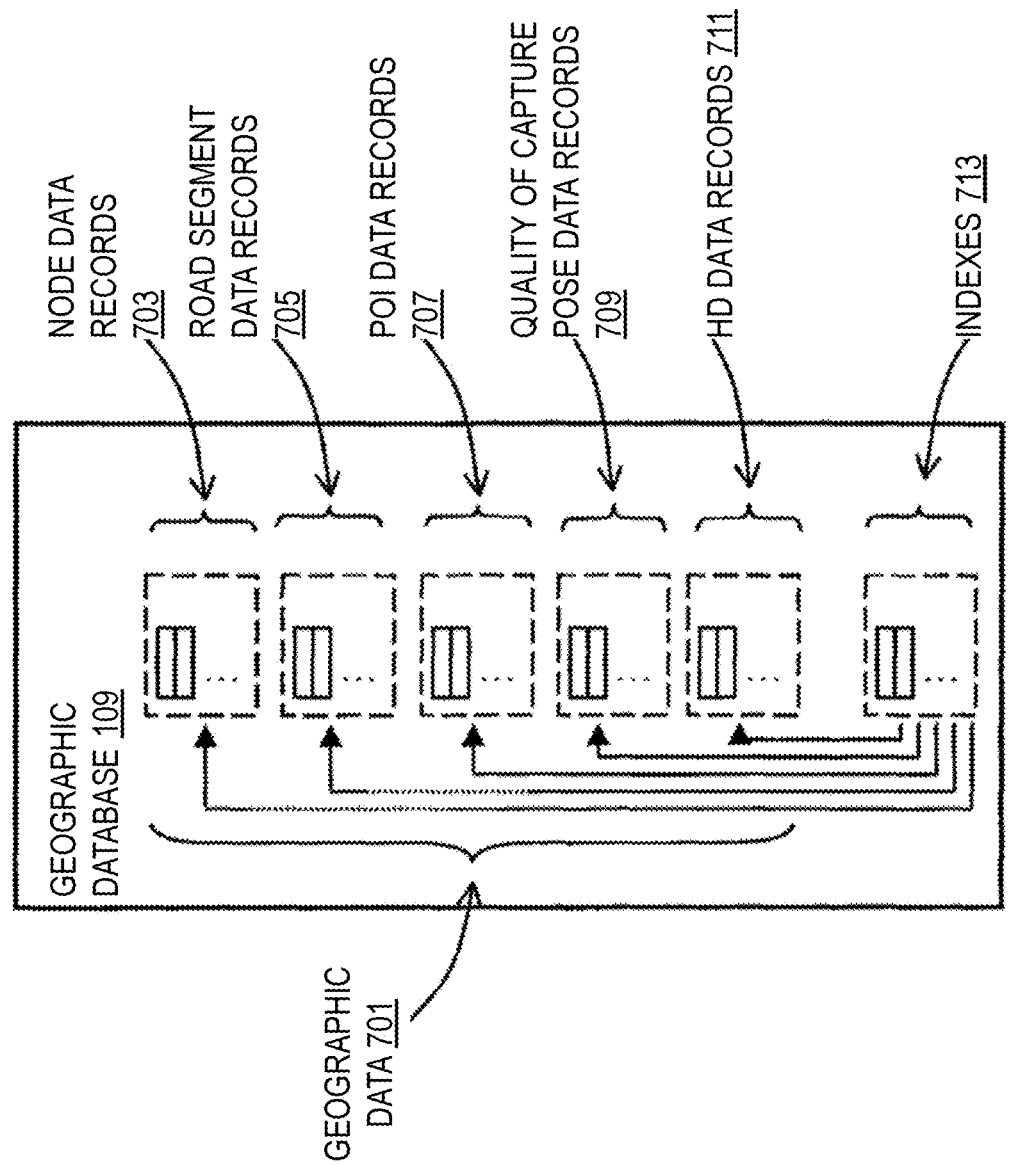
FIG. 7 is a diagram of a geographic database, according to one embodiment.

FIG. 7 is a diagram of a geographic database, according to one embodiment. In one embodiment, the geographic database 109 includes geographic data 701 used for (or configured to be compiled to be used for) mapping and/or navigation-related services, such as for video odometry based on the captured features (e.g., survey points 107). In one embodiment, the geographic database 109 includes high resolution or high definition (HD) mapping data that provide centimeter-level or better accuracy of map features. For example, the geographic database 109 can be based on LiDAR or equivalent technology to collect billions of 3D points and model road surfaces and other map features down to the number lanes and their widths. In one embodiment, the HD mapping data (e.g., HD data records 711) capture and store details such as the slope and curvature of the road, lane markings, roadside objects such as signposts, including what the signage denotes. By way of example, the HD mapping data enable highly automated vehicles (e.g., vehicles 101) to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 109.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 109 follows certain conventions. For example, links do not cross themselves and do not cross each other except at a node. Also, there are no duplicated shape points, nodes, or links. Two links that connect each other have a common node. In the geographic database 109, overlapping geographic features are represented by overlapping polygons. When polygons overlap, the boundary of one polygon crosses the boundary of the other polygon. In the geographic database 109, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 109 includes node data records 703, road segment or link data records 705, POI data records 707, quality of capture pose data records 709, HD mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 109. In one embodiment, the indexes 713 may be used to quickly locate data without having to search every row in the geographic database 109 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles (e.g., vehicles 1101), cars, and/or other entities. Alternatively, the geographic database 109 can contain path segment and node data records or other data that represent pedestrian paths or areas in addition to or instead of the vehicle road record data, for example.

The road/link segments and nodes can be associated with attributes, such as functional class, a road elevation, a speed category, a presence or absence of road features, geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 109 can include data about the POIs and their respective locations in the POI data records 707. The geographic database 109 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 109 can also include quality of capture pose data records 709 for storing the known quality/accuracy/location of survey points 107, accuracy and reliability standards or specifications (e.g., for various autonomous applications), pixel positions of the survey points 107 in all previously obtained captures within a certain radius, error associated with the capture observations, error curves, mean/standard of deviation with the number of passes, histograms, percentages, and/or types of situations where accuracy and reliability specifications are not met for automatically selecting a sensor system 103 covering an area of interest. By way of example, the quality of capture pose data records 709 can be associated with one or more of the node records 703, road segment records 705, and/or POI data records 707 to support localization or visual odometry based on the features (e.g., survey points and/or ground control points) stored therein and the corresponding estimated quality of the features. In this way, the quality of capture pose data records 709 can also be associated with or used to classify the characteristics or metadata of the corresponding records 703, 705, and/or 707.

In one embodiment, as discussed above, the HD mapping data records 711 model road surfaces and other map features to centimeter-level or better accuracy. The HD mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 711 are divided into spatial partitions of varying sizes to provide HD mapping data to vehicles 125 (e.g., autonomous vehicles) and other end user devices (e.g., a UE 115) with near real-time speed without overloading the available resources of the vehicles 101 and/or the UEs 115 (e.g., computational, memory, bandwidth, etc. resources).

In one embodiment, the HD mapping data records 711 are created from high-resolution 3D mesh or point-cloud data generated, for instance, from LiDAR-equipped vehicles (e.g., one or more vehicles 101). The 3D mesh or point-cloud data are processed to create 3D representations of a street or geographic environment at centimeter-level accuracy for storage in the HD mapping data records 711.

In one embodiment, the HD mapping data records 711 also include real-time sensor data collected from probe vehicles in the field (e.g., one or more vehicles 101). The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 109 can be maintained by a content provider 113 in association with the services platform 123 (e.g., a map developer). The map developer can collect geographic data to generate and enhance the geographic database 109. There can be different ways used by the map developer to collect data. These ways can include obtaining data from other sources, such as municipalities or respective geographic authorities. In addition, the map developer can employ field personnel to travel by vehicle (e.g., a vehicle 101 and/or a UE 115) along roads throughout a geographic area of interest to observe features and/or record information about them, for example. Also, remote sensing, such as aerial or satellite photography (e.g., from the satellites 127), can be used.

The geographic database 109 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or a UE 115, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for automatically selecting the most appropriate sensor system for high-definition map feature accuracy and reliability specifications may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
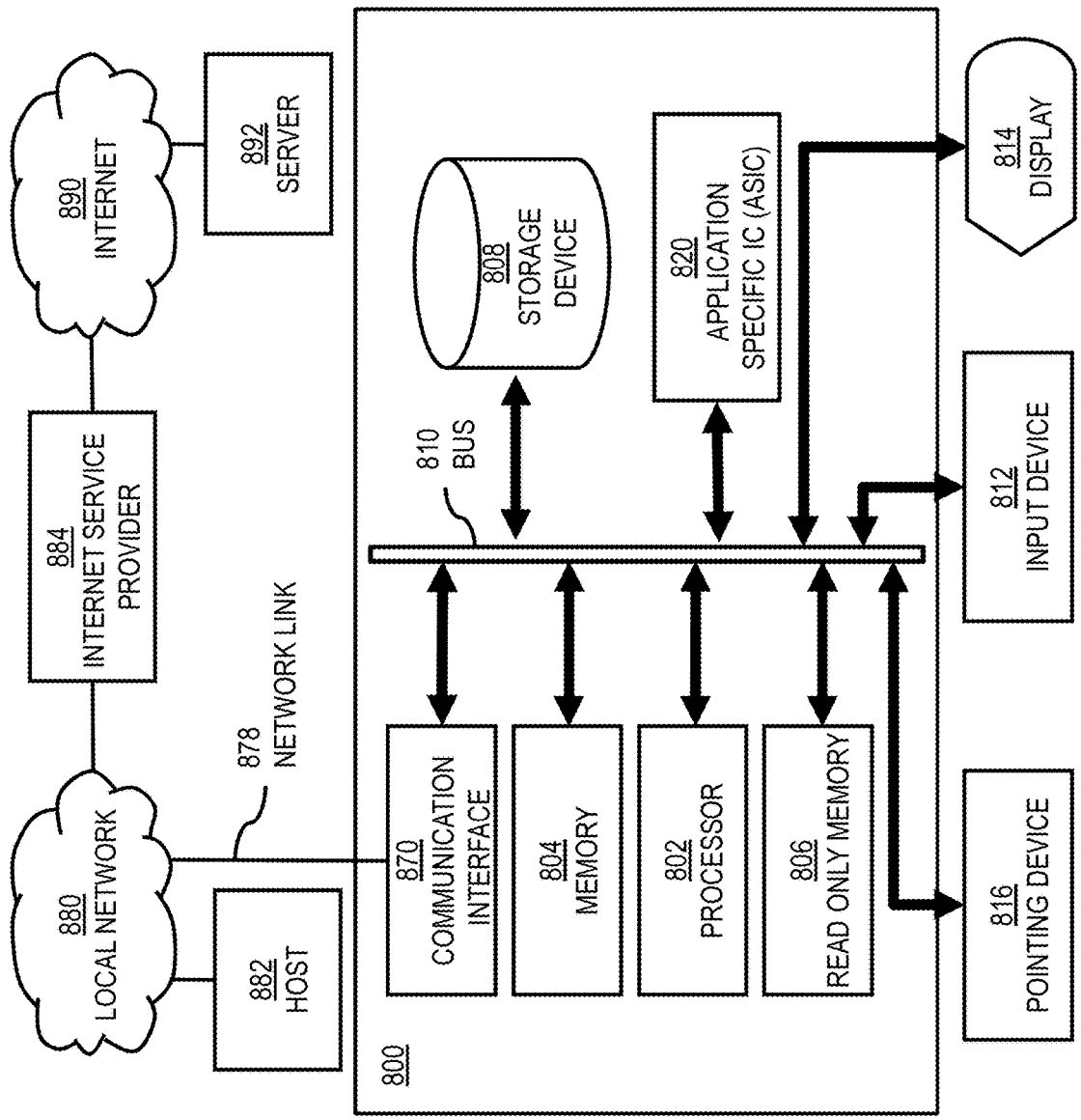
FIG. 8 is a diagram of hardware that can be used to implement an embodiment.

FIG. 8 illustrates a computer system 800 upon which an embodiment of the invention may be implemented. Computer system 800 is programmed (e.g., via computer program code or instructions) to automatically select the most appropriate sensor system for high-definition map feature accuracy and reliability specifications as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to automatically selecting the most appropriate sensor system for high-definition feature accuracy and reliability specifications. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for automatically selecting the most appropriate sensor system for high-definition feature accuracy and reliability specifications. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for automatically selecting the most appropriate sensor system for high-definition feature accuracy and reliability specifications, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 111 for automatically selecting the most appropriate sensor system for high-definition feature accuracy and reliability specifications.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to automatically select the most appropriate sensor system for high-definition map feature accuracy and reliability specifications as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to automatically select the most appropriate sensor system for high-definition map feature accuracy and reliability specifications. The memory 905 also stores the data associated with or generated by the execution of the inventive steps.

Figure 10:
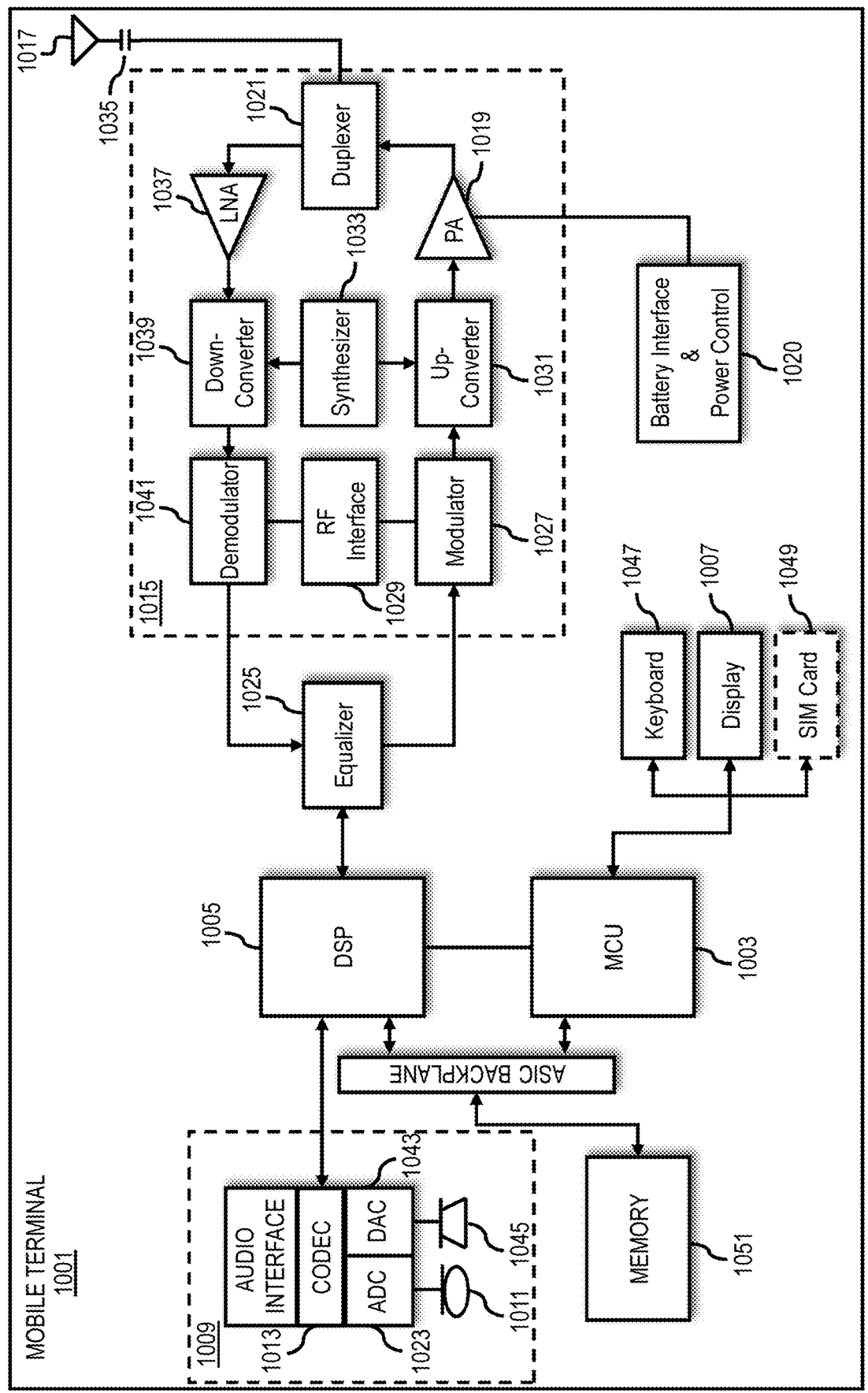
FIG. 10 is a diagram of a mobile terminal (e.g., handset or vehicle or part thereof) that can be used to implement an embodiment.

FIG. 10 is a diagram of exemplary components of a mobile terminal (e.g., a vehicle 125, a UE 127, or component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the backend encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to automatically select the most appropriate sensor system for high-definition map feature accuracy and reliability specifications. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
selecting at least one survey point that has a known physical location;
initiating a plurality of passes to capture a plurality of images of the at least one survey point using a sensor system;
for each pass of the plurality of passes, calculating an estimated location of the at least one survey point based on the plurality of images and calculating error data based on the estimated location and the known physical location;
generating an error curve with respect to a number of the plurality of passes based on the error data for said each pass; and
providing an output indicating a target number of passes to meet an error specification based on the error curve.

2. The method of claim 1, wherein the target number of passes is selected based on a target error tolerance, a target error spread, or a combination thereof.

3. The method of claim 1, wherein the error data includes a mean, a standard deviation, or a combination thereof of an error between the estimated location and the known location for said each pass.

4. The method of claim 1, further comprising:
generating a histogram of the number of the plurality of passes that meets the error specification using all the at least one survey point.

5. The method of claim 1, further comprising:
generating a histogram of a mean number of the plurality of passes across one or more of the at least one survey point.

6. The method of claim 1, further comprising:
providing an output indicating a number of the at least one survey point for which the error specification is not met.

7. The method of claim 1, further comprising:
comparing or selecting the sensor system in relation to another sensor system based on the error curve.

8. The method of claim 1, wherein the plurality of passes is performed under a different condition.

9. The method of claim 1, wherein the sensor system includes a camera system, and wherein the estimated location is determined based on a ray generated from a location of the camera system through a pixel location on an image plane of the plurality of images.

10. The method of claim 1, wherein the sensor system includes a lidar system or a radar system, and the estimated location is determined from a point cloud generated by the lidar system or the radar system.

11. An apparatus comprising:
at least one processor; and
at least one memory including computer program code for one or more programs, the at least one memory and the computer program code configured to, with the at least one processor, cause the apparatus to perform at least the following,
select at least one survey point that has a known physical location;
initiate a plurality of passes to capture a plurality of images of the at least one survey point using a sensor system;
for each pass of the plurality of passes, calculate an estimated location of the at least one survey point based on the plurality of images and calculate error data based on the estimated location and the known physical location;
generate an error curve with respect to a number of the plurality of passes based on error data for said each pass; and
provide an output indicating a target number of passes to meet an error specification based on the error curve.

12. The apparatus of claim 11, wherein the target number of passes is selected based on target error tolerance, a target error spread, or a combination thereof.

13. The apparatus of claim 11, wherein the error data includes a mean, a standard deviation, or a combination thereof of an error between the estimated location and the known location for said each pass.

14. The apparatus of claim 11, wherein the apparatus is further caused to:
generate a histogram of the number of the plurality of passes that meets the error specification using all the at least one survey point.

15. The apparatus of claim 11, wherein the apparatus is further caused to:
generate a histogram of a mean number of the plurality of passes across one or more of the at least one survey point.

16. The apparatus of claim 11, wherein the apparatus is further caused to:
provide an output indicating a number of the at least one survey point for which the error specification is not met.

17. The apparatus of claim 11, wherein the apparatus is further caused to:
comparing or selecting the sensor system in relation to another sensor system based on the error curve.

18. A non-transitory computer-readable storage medium carrying one or more sequences of one or more instructions which, when executed by one or more processors, cause an apparatus to at least perform the following steps:
selecting at least one survey point that has a known physical location;
initiating a plurality of passes to capture a plurality of images of the at least one survey point using an image-based sensor system;
for each pass of the plurality of passes, calculating an estimated location of the at least one survey point based on the plurality of images and calculating error data based on the estimated location and the known physical location;
generating an error curve with respect to a number of the plurality of passes based on the error data for said each pass; and
providing an output indicating a target number of passes to meet an error specification based on the error curve.

19. The non-transitory computer-readable storage medium of claim 18, wherein the target number of passes is selected based on target error tolerance, a target error spread, or a combination thereof.

20. The non-transitory computer-readable storage medium of claim 18, wherein the error data includes a mean, a standard deviation, or a combination thereof of an error between the estimated location and the known location for said each pass.

* * * * *